Sept. 11, 1951  W. H. SILVER ET AL  2,567,737
FLEXIBLY CONNECTED TRACTOR-MOUNTED IMPLEMENT
Filed July 26, 1946  2 Sheets-Sheet 1
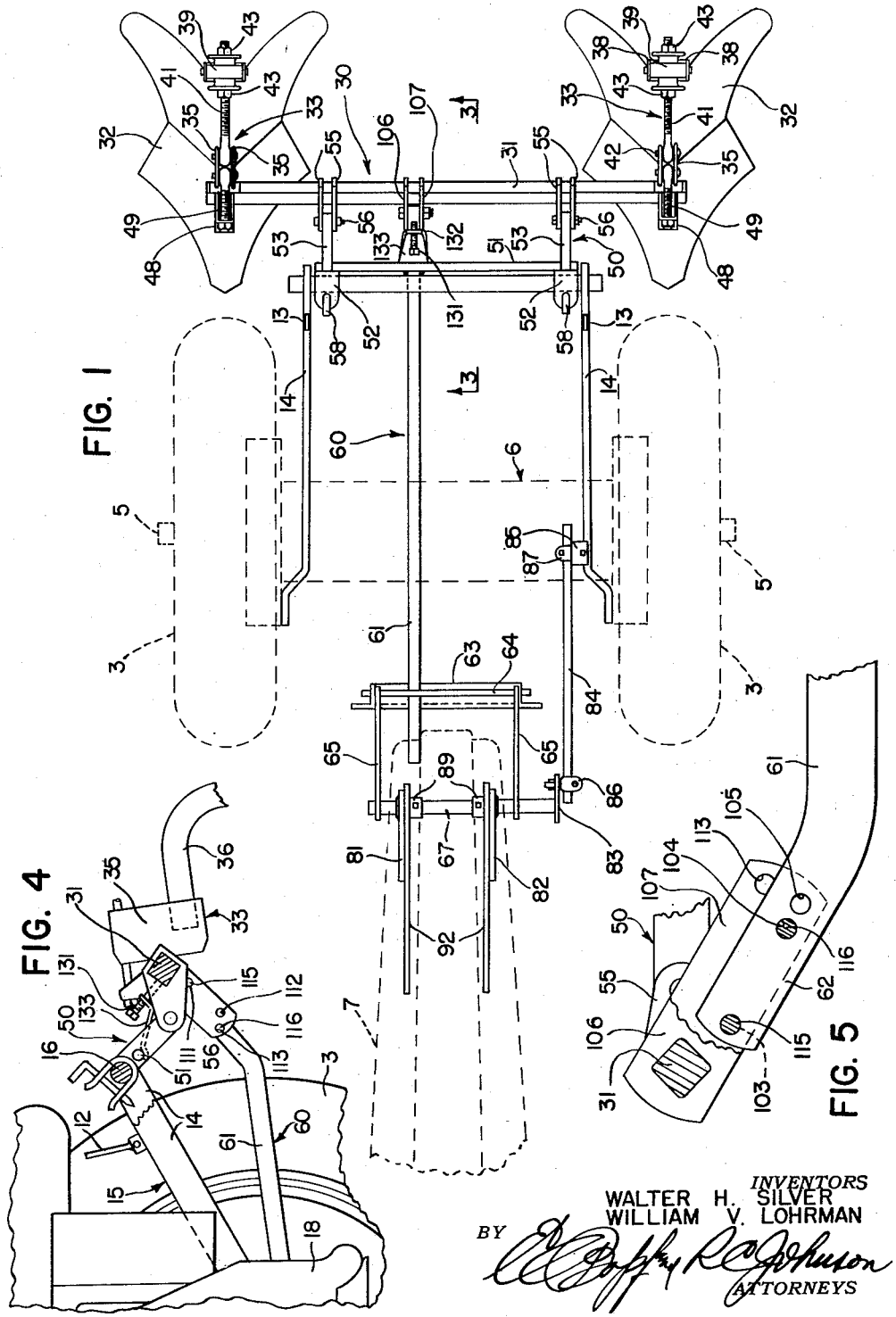
INVENTORS
WALTER H. SILVER
WILLIAM V. LOHRMAN
BY
ATTORNEYS

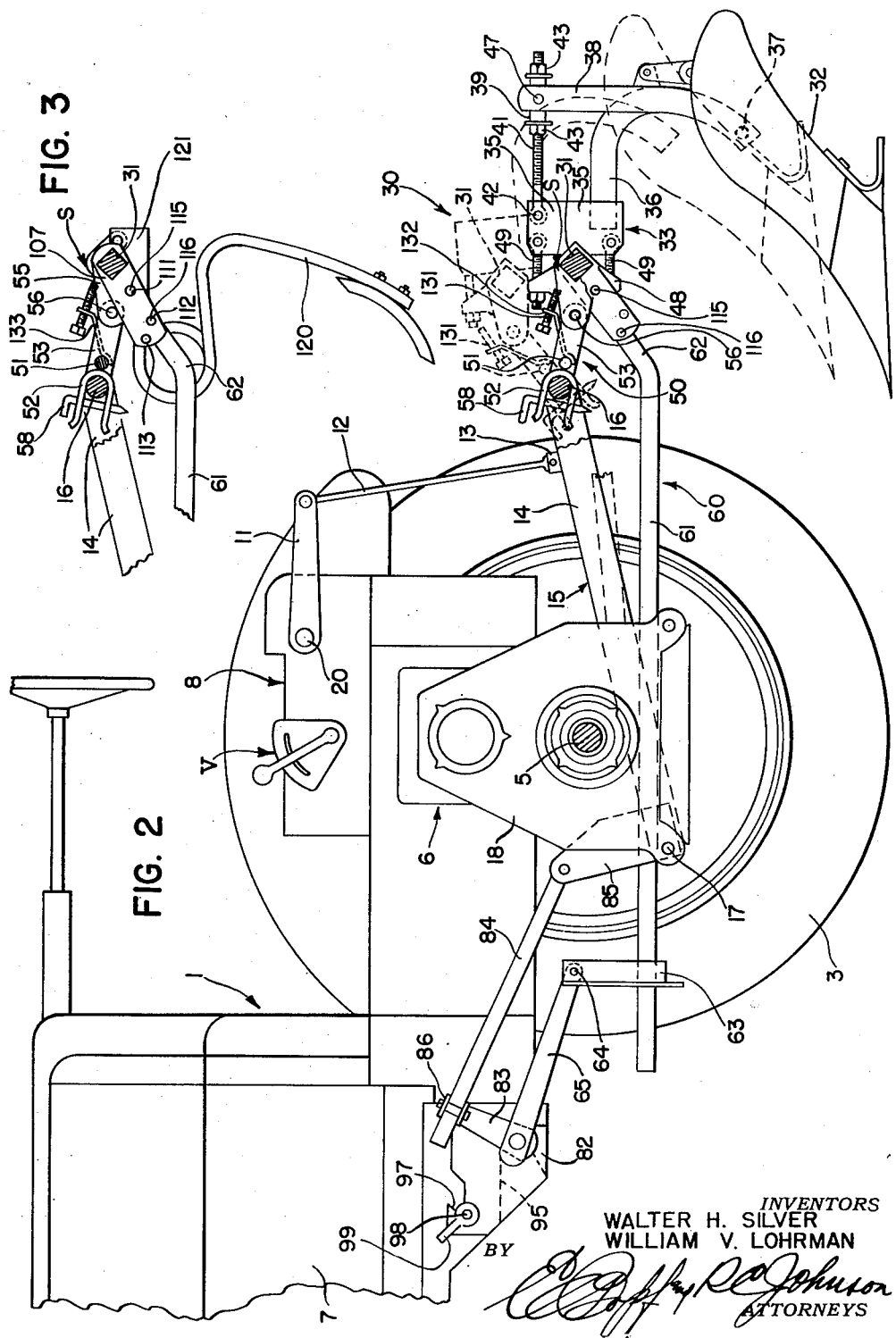

Patented Sept. 11, 1951

2,567,737

UNITED STATES PATENT OFFICE 2,567,737

FLEXIBLY CONNECTED TRACTOR-MOUNTED IMPLEMENT

Walter H. Silver, Moline, Ill., and William V. Lohrman, Davenport, Iowa, assignors to Deere & Company, Moline, Ill., a corporation of Illinois Application July 26, 1946, Serial No. 686,504

8 Claims. (Cl. 97—50)

1

The present invention relates generally to agricultural machines and more particularly to tractor mounted implements.

The object and general nature of the present invention is the provision of a new and improved tractor-mounted implement which not only may be attached easily and quickly, and detached from its supporting tractor with equal facility, but also which is especially constructed to secure flexibility whereby the passage of the tractor over uneven ground does not cause undesirable or excessive variations in the operating depth of the tools.

More particularly, it is a feature of the present invention to provide a pivoted hitch frame between the drawbar of the tractor and the rear portion of the implement frame, which hitch frame is pivotally connected both with the tractor drawbar and the implement whereby the rear end of the implement may rise and fall in operation without causing appreciable variations in the operating depth. In this connection it is a further feature of this invention to provide means whereby the tractor drawbar may be utilized as a raising means for raising the rear end of the implement out of operating position, to which end suitable stop means is associated with the pivoted hitch connection whereby to limit the pivoting of the hitch member when raising the implement.

These and other objects and advantages of the present invention will be apparent to those skilled in the art after a consideration of the following detailed description, taken in conjunction with the accompanying drawings in which:

Figure 1 is a plan view of an integral implement in which the principles of the present invention have been incorporated, there being shown by way of example a two-bottom integral lister mounted on a supporting and propelling tractor;

Figure 2 is a side view of the machine shown in Figure 1;

Figure 3 is a fragmentary sectional view taken generally along the line 3—3 of Figure 1, but showing the tool bar equipped with cultivating tools in place of the lister bottoms shown in Figures 1 and 2.

Figure 4 is a fragmentary side view showing the implement in its transport position.

Figure 5 is a side view of the rear end of the detachable depth control bar showing its two optional connections with the rear transverse tool bar.

2

Referring now to the drawings, particularly Figures 1 and 2, the reference numeral 1 indicates a farm tractor of the four wheel type, having front wheels (not shown) and rear wheels 3 journaled for rotation on axle shafts 5 carried by a rear axle 6. The tractor includes a power plant 7 and a power lift unit 8 of the hydraulic type, including suitable valve mechanism V and other necessary parts, such as a pair of lift arms 11 and links 12 connecting the arms 11 to lugs 13 formed on the side members 14 of a generally vertically swingable tractor drawbar or bail member 15. The latter is preferably in the form of a U-shaped member, considered as a whole, and includes a rear transverse section 16 which may be formed of round stock. The sides 14 may be strap members, and the latter are pivoted at their front ends, as at 17, to drop housings 18 which form a part of the tractor rear axle structure 6. Preferably, the rear part 16 is welded or otherwise permanently secured to the side parts 14 of the tractor drawbar or bail 15. The two power lift arms 11 are clamped or otherwise fixed in any suitable manner to the ends of a power lift rockshaft 20 which forms a part of the hydraulic unit 8.

As best shown in Figures 1 and 2, one of the implements that may readily and quickly be attached to and detached from the tractor is a two bottom lister, indicated in its entirety by the reference numeral 30. The implement 30 includes a tool bar 31 extending transversely and at its ends receives lister bottoms 32 firmly and rigidly secured to the tool bar 31 by clamping means 33 and associated parts. As best shown in Figure 2, each clamping unit includes a pair of brackets 35 fixed, as by welding or the like, to the forward end of a tool standard 36 the lower end of which is pivoted, as at 37, to a pair of upstanding vertical brackets 38 to which the lister bottom 32 is fixed in any suitable manner. The upper ends of the brackets 38 are apertured to receive a trunnion member 39, the latter member receiving the rear end of a threaded adjusting rod 41 which is pivoted, as at 42, to the bracket plates 35. Lock nuts 43 fix the trunnion member 39 in different positions of adjustment along the threaded rod 41, whereby the suck of the plow bottom may be adjusted. Each trunnion 39 is mounted in the upper ends of the vertical brackets 38 by horizontal pivots 47. The brackets 35 are clamped to the ends of the tool bar 31 by caps 48 and clamping bolts 49.

A hitch member 50 is adapted to be connected between the transverse tool bar 31 and the tractor drawbar 15. The hitch member 50, which constitutes a transversely disposed member pivotally connected with the implement and with the tractor for pivotal movement relative thereto about generally transverse axes, is made up of a transverse bar or pipe 51, a pair of forwardly facing U-shaped parts 52, constituting forwardly facing drawbar-receiving sockets, and a pair of rearwardly extending apertured lugs 53, the lugs and socket members being secured, as by welding, to the ends of the member 51. To receive the apertured hitch lugs 53, the tool bar 31 is provided with two pairs of apertured forwardly extending lugs 55, each pair being spaced apart so as to receive the associated hitch member lug 53 therebetween. A pivot bolt or pin 56 serves to pivotally connect each set of apertured lugs. The forwardly facing U-shaped socket members 52 have their forward ends apertured to receive a quick detachable connecting pin 58, which may be of any suitable construction, and the apertures are so placed that when the transverse section 16 of the tractor drawbar is seated in the socket members 52 the pins 58 are disposed in front of the part 16 in a position to hold the latter seated in the members 52 and fitting with sufficient snugness to hold the implement in position but accommodating the vertical swinging of the hitch member 50 relative to the drawbar 15, which occurs when the outfit is traveling over uneven ground.

A depth adjusting and stabilizing structure is associated with the tools 32 for holding them in the proper position for different depths of operation, it being understood that the drawbar 15 may be raised into different positions by proper actuation of the valve V. However, the drawbar 15 is free to be moved vertically beyond its position of adjustment and to return to that position but not below it. The depth adjusting and stabilizing structure will now be described.

The transverse tool bar 31 forms a part of a tool beam structure that is indicated in its entirety by the reference numeral 60. The tool beam structure 60 also includes a longitudinally extending depth control or stabilizing bar or beam 61 that extends forwardly underneath the rear axle 6 of the tractor and at its forward end rests in a vertically shiftable depth adjusting bail member 63, the upper ends of which, as best shown in Figure 2, are apertured to receive a cross bar 64 that is carried in the rear lower ends of a pair of arms 65 which at their upper or forward portions are welded or otherwise suitably fixed to a cross shaft 67. The latter is supported in suitable bearing brackets 81 and 82 and at one end has an arm 83 fixed thereto and connected by a link 84 to an arm 85 formed on or carried by the left side member 14 of the tractor drawbar 15. Connection between the front end of the link 84 and the arm 83 is effected by means of a clamping swivel 86, and a cylinder clamping swivel 87 serves to connect the rear end of the link 84 with the upper end of the arm 85. The cross shaft 67 is held in the desired lateral position with respect to the bearing brackets 81 and 82 by clamp collars 89. The two bearing plates 81 and 82 are adapted to be readily and quickly attachable to and detachable from the tractor 1, preferably the intermediate portion thereof forward of the rear axle 6. To this end, the tractor carries a pair of attaching plates 92 bolted to the tractor or otherwise mounted thereon. Each of the attaching plates 92 is provided with a forwardly facing notch 95 which is adapted to receive the cross shaft 67. Also, each of the bearing brackets 81 and 82 is provided with a rearwardly facing notch 97 which is adapted to receive a stud 98 carried by the associated attaching bracket 92, each stud 98 receiving a wing nut 99.

The rear end of the depth control or stabilizing bar 61 is of particular configuration. The rear end portion 62 of the bar 61 extends upwardly and rearwardly and, as best shown in Figure 5, is provided with a rear opening 103 and a pair of forward openings 104 and 105. The rear portion 62 of the bar 61 is adapted to be received between a pair of bracket plates 106 and 107, suitably fixed, as by welding, to the generally central portion of the transverse tool bar 31 in laterally spaced relation. Each of the bracket plates 106 and 107 is provided with three openings 111, 112 and 113, best shown in Figure 3. The rear pair of openings 111 is adapted to receive a bolt 115 that passes through the rear opening 103 of the depth control bar 61. A second bolt 116 is adapted to be placed either in the openings 112 in the bracket plates 106 and 107 and the opening 104 in the control bar 61, or in the openings 113 in the bracket plates 106 and 107 and the other opening 105 in the depth control bar. The former position of the bolt 116 is shown in Figure 3 while the latter position is shown in Figure 2 and provides for mounting the tool bar 31 rigidly on the depth control bar 61 in either of two optional positions. Disposing the tool bar 31 in different positions relative to the control bar 61 may be necessary when changing from one type of ground working tool to another, as for example, from the lister bottoms 32 shown in Figure 2 to the spring cultivator teeth 120 shown in Figure 3, the teeth 120 being adapted to be mounted on the tool bar 31 by slightly different clamping means 121, the details of which do not, however, comprise per se any part of the present invention.

The swinging movement of the hitch member 50 relative to the tool beam 60 and associated tools about the transverse axis defined by the pivots 56 is limited in one direction by means of an adjustably mounted set screw 131 disposed in a tapped opening in the rear end 132 of a bracket 133 that is fixed, as by welding, to the cross bar 51. Normally, the adjusting screw 131 is disposed so that there is a space, indicated in Figure 2 by the reference character S, which permits a certain amount of generally vertical swinging of the hitch member 50 relative to the supporting tractor drawbar 15 and the tool beam 60. An upper position during such floating action is indicated in dotted lines in Figure 2. However, when the drawbar 15 is swung upwardly, when it is desired to raise the tools into a transport position, the hitch member 50 swings relative to the tool beam 60 until the adjusting screw 131 comes into engagement with the tool bar 31, as shown in Figure 4, after which the hitch member 50 is held against pivoting relative to the tool beam 60 and further raising movement of the tractor drawbar 15 results in bodily lifting the implement into its transport position.

By suitably operating the valve mechanism V, the tractor power lift 8 acts through the arms 11 and links 12 to raise and lower the tractor drawbar 15, and the arms 85 on the latter act through the links 84 and associated parts to raise and lower the forward yoke 63. Preferably, the parts are so arranged that the rear section 16 of the tractor drawbar and the forward yoke 63 are raised and lowered approximately the same amount. However, during the depth operating range of the power lift, the hitch member 50 is free to swing generally vertically so that the depth of operation of the lister bottoms is controlled substantially entirely by the position of the forward yoke 63, the rear end of the implement being free, within limits, to swing vertically, due to the aforesaid pivoting of the hitch member 50. However, when the tools are raised into a transport position, the limit stop means 131 acts between the hitch member 50 and the transverse tool bar 31, holding the parts in the position shown in Figure 4. In normal operation, of course, the hitch member is free to pivot, whereby the ground working tools are not forced upwardly or downwardly when the tractor passes over ridges, depressions and other ground irregularities.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. An implement adapted to be mounted on a tractor having a generally vertically swingable drawbar with a rear transverse section, said implement comprising a generally longitudinally extending beam adapted to extend at its forward end underneath the tractor, a transverse bar, means for fixing the rear end of said beam to the intermediate portion of said transverse bar, and a hitch connection pivotally connected to the transverse bar at opposite sides of the rear end of said beam for movement relative thereto about a transverse axis, said hitch connection including a pair of laterally spaced forwardly facing socket members adapted to receive laterally spaced portions of the transverse section of the tractor drawbar, and means carried by said socket members for holding said hitch connection in operative engagement with the transverse section of said tractor drawbar.

2. The invention set forth in claim 1, further characterized by depth adjusting means adapted to be attached to the tractor forward of said drawbar and including a raising and lowering member loosely receiving the front end of said beam, whereby the latter is withdrawable rearwardly from said beam-receiving member and said socket members being withdrawable rearwardly from the tractor drawbar upon the release of said connecting means.

3. An implement adapted to be attached to a tractor having a generally vertically swingable drawbar provided with a rear transverse section, said implement comprising a generally longitudinally extending beam, a rear transverse bar rigidly connected at its midportion with the rear portion of the longitudinally extending beam, tool means on said transverse bar, a transverse hitch member pivotally connected at a pair of laterally spaced points with said transverse bar whereby said hitch member is capable of vertical swinging relative to said beam about a generally transverse axis, and means for pivotally and releasably connecting the forward portion of said transverse hitch member at a pair of laterally spaced apart points with the transverse section of said tractor drawbar whereby said hitch member is adapted to pivot relative to said drawbar about a generally transverse axis.

4. An agricultural implement adapted to be connected to a tractor having a rearwardly extending generally vertically shiftable drawbar provided with a transverse section, said implement comprising a generally fore and aft extending bar, a transverse bar fixed to the rear end of said longitudinal bar, tool means fixed to said transverse bar, a pair of laterally spaced apertured lugs fixed to said transverse bar, a hitch member having a pair of laterally spaced rearwardly directed apertured lugs, pivot means connecting the lugs on said transverse bar with the lugs on said hitch member, the latter member having a pair of laterally spaced forwardly facing yokes having apertures therein, said yokes being adapted to receive the transverse section of said tractor drawbar and the forward end of said longitudinally extending bar being adapted to be received by a part on the tractor, and pins removably disposed in the apertures of said yokes forward of the transverse portion of the tractor drawbar for releasably and pivotally connecting the hitch member with the tractor drawbar.

5. The invention set forth in claim 4, further characterized by a bracket on an intermediate portion of said hitch member and carrying a part adapted to engage the transverse bar for limiting the pivotal movement of said hitch member relative to said transverse tool bar.

6. In an agricultural machine comprising a mobile frame, a pair of fore and aft spaced generally vertically shiftable members mounted thereon for simultaneous generally vertical movement, a fore and aft extending tool-carrying beam having a forward end supported for vertical movement by the forward shiftable member, and ground working tool means carried on the rear portion of said beam, a hitch connection comprising a transverse part adapted to be pivotally connected at its forward side with the rear shiftable member, a transverse pivot connecting the rear side of said transverse part with the rear portion of said beam, and a stop on said transverse part engageable with said beam for limiting the relative pivotal movement between said part and beam, said stop normally being spaced from said beam, whereby upon simultaneous actuation of said shiftable members, the front end of said beam is raised without raising the rear end until the stop on said transverse part engages said beam.

7. A tractor mounted implement adapted to be mounted on a tractor having a generally vertically swingable rear drawbar having a rear transverse portion, and a generally vertically shiftable depth-adjusting member mounted on the tractor forward of the drawbar, said implement comprising a generally forwardly extending bar, a transverse tool-receiving bar connected rigidly to the rear end of said first mentioned bar and adapted to receive ground working tools, an attaching hitch member comprising a transverse part pivotally connected adjacent its ends to said transverse tool bar and having a pair of laterally spaced apart drawbar-receiving sockets each open at one side so as to embrace and be pivotally connected with the transverse portion of said tractor drawbar, and releasable means holding said sockets in draft transmitting relation with said transverse drawbar portion, said forwardly extending bar being adapted to be connected at its forward end with said tractor-carried depth control member for generally vertical swinging movement relative thereto so as to accommodate passage of the machine over uneven ground.

8. The invention set forth in claim 7, further characterized by cooperating stop means on said attaching hitch member and said tool-receiving bar, and thereby disconnectible therewith from the tractor, for limiting the relative pivotal movement between the hitch member and tool bar, whereby upward movement of the tractor drawbar raises the tools out of ground working position.

WALTER H. SILVER.
WILLIAM V. LOHRMAN.

REFERENCES CITED

The following references are of record in the file of this patent:

UNITED STATES PATENTS

| Number | Name | Date |
|---|---|---|
| 1,200,107 | Heylman | Oct. 3, 1916 |
| 2,339,225 | Strandlund | Jan. 11, 1944 |
| 2,357,847 | Ray | Sept. 12, 1944 |
| 2,414,114 | Martin | Jan. 14, 1947 |
| 2,483,565 | Strandlund | Oct. 4, 1949 |

FOREIGN PATENTS

| Number | Country | Date |
|---|---|---|
| 158,712 | Great Britain | Feb. 14, 1921 |
| 189,998 | Great Britain | Dec. 14, 1922 |
| 556,859 | Great Britain | Oct. 26, 1943 |